United States Patent [19]

Serres et al.

[11] 4,424,317

[45] Jan. 3, 1984

[54] MANNICH CONDENSATION PRODUCT OF ETHYLENE/PROPYLENE/CARBONYL POLYMERS

[75] Inventors: Carl Serres, Naperville, Ill.; John G. Schaffhausen, Aurora, both of Ill.

[73] Assignee: Standard Oil Company (Indiana), Chicago, Ill.

[21] Appl. No.: 447,446

[22] Filed: Dec. 6, 1982

[51] Int. Cl.$^3$ .......................................... C08F 283/00
[52] U.S. Cl. ..................................... 525/539; 525/154; 525/157; 525/416; 526/316; 528/220; 528/229; 528/392
[58] Field of Search ............... 525/154, 157, 416, 539; 526/316; 528/392, 220, 229

[56] References Cited

U.S. PATENT DOCUMENTS

| | | | |
|---|---|---|---|
| 2,351,120 | 6/1944 | Hanford | 525/539 X |
| 2,441,082 | 5/1948 | Pinkney | 528/392 |
| 2,457,279 | 12/1948 | Scott | 528/392 |
| 2,495,255 | 1/1950 | Hoehn | 525/539 |
| 2,495,286 | 1/1950 | Brubaker | 528/392 |
| 3,068,201 | 12/1962 | Michel | 525/539 X |
| 3,780,140 | 12/1973 | Hammer | 528/392 X |

OTHER PUBLICATIONS

Ency. of Polymer Sci. and Technology, vol. 9, pp. 397–402.

Primary Examiner—Lucille M. Phynes
Attorney, Agent, or Firm—William H. Magidson; William T. McClain

[57] ABSTRACT

A Mannich condensation product of an amorphous, oil soluble olefin/carbonyl polymer, amine and formaldehyde yielding reactant wherein the carbonyl groups are provided by at least one member selected from the group consisting of carbon monoxide and vinyl alkyl ketone and lube oil compositions comprising said polymers.

17 Claims, No Drawings

MANNICH CONDENSATION PRODUCT OF ETHYLENE/PROPYLENE/CARBONYL POLYMERS

This invention relates to Mannich condensation products of amorphous, oil soluble olefin/carbonyl polymer, amine and formaldehyde yielding reactant and lube oils containing these products, wherein the carbonyl groups are provided by CO and/or vinyl alkyl ketone. More particularly, this invention relates to Mannich condensation products of amorphous, oil soluble ethylene/propylene/carbonyl polymer, amine and formaldehyde yielding reactant and lube oils containing these products, wherein the carbonyl groups are provided by CO and/or vinyl alkyl ketone.

Commonly assigned U.S. Pat. Nos. 3,872,019 of Culbertson et al.; 4,011,380 of West et al. and 4,131,553 of West (all of which are incorporated by reference) disclose the production of lube oil additives having dispersant and improved properties by the Mannich condensation of an oxidized long chain high molecular weight olefin polymer, a formaldehyde yielding reactant and an amine. While these products are excellent lube oil additives, the tendency to use smaller engines has resulted in lube oils being subjected to higher temperatures and higher shear rates, particularly in those countries where there is no restriction on highway speed. It has now been found that at high temperatures, these lube oil additives tend to provide an inadequate level of lubrication. This is apparently due to the fact that at high temperatures, the lube oil additives are not sufficiently shear stable to withstand shearing action and there is a decrease in the viscosity of the additive resulting in reduced lubricity. Generally the European Market desires a Bosch Shear Stability Index under 30 while the U.S. Market desires a Bosch Shear Stability Index under 45. Accordingly, there is a need for new Mannich additives, particularly those having improved shear stability.

While numerous patents disclose the production of olefin/carbonyl polymers wherein the carbonyl group is provided by CO and/or alkyl vinyl ketones, such as U.S. Pat. No. 3,449,251 of Tunkel et al.; 3,530,109 of Fenton; 3,591,502 of Hnyckyj; 3,689,460 of Nozaki; 3,694,412 of Nozaki; 3,835,123 of Nozaki; 3,948,873 of Hudgin; 3,984,388 of Shryne et al.; 4,024,326 of Hudgin; 4,076,911 of Fenton; 4,157,428 of Hammer; 4,192,942 of Mainord; 4,251,340 of Johnson et al; and British specification No. 925,130 of Loeb (all of these are incorporated by reference), none of these patents disclose the formation of Mannich condensation products from these polymers. Further, none of these references disclose amorphous, oil soluble ethylene/propylene/carbonyl Mannich condensation products.

The general object of this invention is to provide new Mannich condensation products. A more specific object of this invention is to provide lube oil additives based on Mannich condensation products having shear stability. Other objects appear hereinafter.

The objects of this invention can be attained with new Mannich condensation products of amorphous, oil soluble olefin carbonyl polymers (preferably ethylene/propylene/carbonyl polymers), amine and formaldehyde yielding reactant. These Mannich products, particularly those based on the preferred ethylene/propylene/carbonyl polymers, can be formed into lube oil compositions having high shear stability enabling them to provide lubricity at relatively high temperatures. The preferred copolymer useful in this invention are the subject of our copending application Ser. No. 447,447 and 447,445 filed on even date, which are hereby incorporated by reference.

Briefly, the products of this invention can be prepared by reacting oil soluble, amorphous olefin/carbonyl polymers, amine and formaldehyde yielding reactant. In somewhat greater detail, the additives of this invention can be prepared by (1) polymerizing at least one olefin monomer ($C_nH_{2n}$) and either carbon monoxide and/or vinyl alkyl ketone, (2) condensing under Mannich conditions the olefinic/CO polymers of step (1), amine and formaldehyde yielding reactant.

The olefin/carbonyl polymers useful in this invention can be prepared by any of the techniques described in the aforesaid patents. For example, the typical free radical catalysts (e.g. benzoyl peroxide) can be used to form ethylene/carbonyl polymers. However, propylene/carbonyl polymers, ethylene/propylene/carbonyl polymers, etc. must be prepared using the so-called Ziegler catalysts, using a transition metal compound and a metal alkyl compound, since it is difficult to polymerize propylene to high molecular weight polymers using a free radical catalyst. Preferably, the amorphous, oil soluble ethylene/propylene/carbonyl polymers useful in this invention are prepared by polymerization using a catalyst system comprising an aluminum alkyl and a vanadium halide, oxyhalide or oxyalkoxide. This catalyst combination assures the formation of an amorphous, random, oil soluble polymer.

The olefin monomers ($C_nH_{2n}$) suitable for preparation of the polymers of this invention include olefins of the general formula R—CH=CH$_2$, in which R is hydrogen, an aliphatic radical of from 1 to about 20 carbon atoms, for example, propene, 1-butene, 1-hexene, 4-methyl-1-pentene, and 1-decene. Other olefinic monomers having a single double bond, such as styrene, or a plurality of double bonds can be polymerized with the olefin. In particular, diolefins containing from about 4 to about 25 carbon atoms, e.g., 1,3-butadiene, 1,4-hexadiene, 1,4-pentadiene, 2-methyl-1,5-hexadiene, 1,7-octadiene, 4-methylene-2-norbornene, norbornadiene, etc. can be used.

While virtually any concentration of carbonyl groups can be incorporated into ethylene/carbonyl polymers by free radical polymerization, relatively low concentrations of carbonyl can be incorporated into propylene/carbonyl, ethylene/propylene/carbonyl polymers since carbon monoxide and alkyl vinyl ketones tend to be poisons for the so-called Ziegler catalysts. Accordingly, the more carbonyl groups in the polymer, the lower the molecular weight of the resultant propylene polymer. Typically, approximately 0.02 to 2 parts by weight carbon monoxide and/or 0.1 to 15 parts by alkyl vinyl ketone can be employed per each 100 parts by weight propylene or ethylene/propylene. Approximately half of the carbon monoxide appears to react with the catalyst and poison same and approximately half is incorporated into the propylene polymer.

Preferably, ethylene and propylene are copolymerized with either CO and/or a vinyl alkyl ketone containing from about 1 to 8 carbon atoms in the alkyl group of the vinyl alkyl ketone. For lube oil use, the mole ratio of ethylene to propylene is desirably from about 35:65 to 60:40, i.e., the weight ratio of ethylene to propylene is at least 1. As the weight ratio of ethylene to propylene in the polymer passes unity, the solubility of Mannich Condensation products based on the preferred polymer is reduced at low temperatures and there is a greater tendency for the Mannich Condensation products to not provide lubricity at high operating temperatures. As the concentration of propylene in the polymer increases to above 65 mol percent, the shear stability of the Mannich Condensation product in lube oil decreases.

The preferred olefin/carbonyl polymers for use in the preparation of Mannich Condensation products have an inherent viscosity of from about 0.4 to 1.3 (0.4 g/100 ml toluene at 30° C.). In those cases where all or part of the carbonyl groups are provided by carbon monoxide, the preferred inherent viscosity is about 0.4 to 1.3 and the preferred level of carbonyl functionality is about 0.01 to 0.2 parts by weight per 100 parts by weight olefin. When vinyl alkyl ketones provide all of the carbonyl functionality, the preferred inherent viscosity is about 0.4 to 1.1 and the preferred alkyl vinyl ketone concentration in the monomer composition is about 0.1 to 15 parts by weight vinyl alkyl ketone per 100 parts by weight olefin, preferably about 0.3 to 5 parts by weight vinyl alkyl ketone. Typically only about half of the vinyl alkyl ketone is incorporated in the polymer (i.e. 0.05 to 7.5 parts by weight, preferably 0.15 to 2.5 parts by weight per 100 parts by weight ethylene and propylene).

The monomers can be polymerized under conventional conditions, such as slurry, mass or vapor phase, as is common in the olefin polymerization arts.

Polymerization readily occurs at temperatures ranging from about 10° C. to 200° C. as is common in the olefin polymerization art.

After the polymerization reaction is complete, the catalyst composition can be inactivated by the addition thereto of a suitable quenching agent as, for example, water or an alcohol such as isopropanol. The polymer formed by the reaction can then be separated from the reaction mixture by conventional procedures well known in the art. Catalyst residues can be removed from the polymer by washing with suitable solvents, such as, for example, water, or an alcohol such as isopropanol. Removal of catalyst residues in some cases is facilitated by diluting the polymerizate with tetrahydrofuran or tetrahydrofuran and ashless wood pulp before washing.

The substantially metal free amorphous, oil soluble, olefin/carbonyl polymer can then be converted to a Mannich lube oil additive by reaction with amine and formaldehyde yielding reactant.

The formaldehyde used in the Mannich reaction can be provided by any common formaldehyde yielding reagent. Examples of formaldehyde yielding reagents are formalin, paraformaldehyde, other linear and cyclic formaldehyde polymers, gaseous formaldehyde and the like.

The amine reactants used in the preparation of the products of the present invention are primary and secondary aliphatic amines containing up to 10 carbon atoms in the aliphatic groups; diamines of the general formula $HN_2(CH_2)_yNH_2$, wherein Y is an integer of 2 to about 12; and polyalkylene polyamines of the general formula:

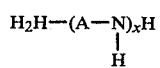

wherein A is a divalent alkylene radical of about 2 to about 12 carbon atoms, and X is an integer from about 1 to about 10. Illustrative of such suitable amines are: methylamine, dibutylamine, cyclohexylamine, propylamine, decylamine, ethylenediamine, trimethylenediamine, tetramethylenediamine, hexamethylenediamine, diethylenetriamine, triethylenetetramine, tetraethylenepentamine, tripropylenetetramine, tetrapropylenepentamine, and other polyalkylene polyamines in which the alkylene group contains up to about 12 carbon atoms. Alkoxylated amines and polyamines can also be employed in this invention.

An infrared spectroscopy method can be used to measure the completeness of the reaction used to produce the Mannich additive. A measurement of the 1680 $cm^{-1}$ adsorption of the Mannich additive which is about 0.220 per 0.5 mm cell path length indicates complete reaction and best additive properties, as determined by engine test values.

In greater detail, the Mannich reaction is preferably carried out with an amine, a formaldehyde yielding reagent, and the amorphous, oil soluble olefin/carbonyl polymer, and, if desired, an oil soluble sulfonic catalyst in an amount up to 40.0 weight percent sulfonic catalyst based on the neat polymer. A wide variety of such sulfonic acid compounds operate to catalyze the reaction. The functional group of the oil soluble sulfonic acid which provides the important catalytic properties is the sulfonic acid group.

The following illustrates one method of conducting the Mannich condensation reaction with the olefin/carbonyl polymer and sulfonic acid compound catalyst. One hundred parts of the olefin/carbonyl polymer in 1,000 parts of SAE 5W mineral oil diluent was heated to 360° F. under a nitrogen blanket. Four tenths part of solid paraformaldehyde, 0.75 part of molten hexamethylenediamine and 1.0 part of an alkyl benzene sulfonic acid having a molecular weight of about 600 in a 39.0% by weight oil solution were simultaneously added to the stirred reaction mixture at a temperature of 360° F. under a nitrogen blanket. The reaction was continued for 2 hours liberating water until complete. The mixture was stripped with nitrogen at 360° F. to remove water and other byproducts. After filtration the mixture was clear.

The Mannich reaction is believed to occur between the active acidic protons on carbon atoms alpha to the carbonyl functions in the polymer. Secondary reactions occur between the active reactants, carbonyl groups, and Mannich nitrogen atoms producing many varied crosslinked and aminated compounds. The active acidic protons react with formaldehyde and the amine. This introduces a detergent dispersant function in the polymer viscosity index improver additive.

The Mannich condensation reaction of the olefin/carbonyl polymer can be carried out in the presence of up to about 40 wt.%, preferably from about 0.10 wt.% to about 2 wt.% based on the polymer of an oil soluble sulfonic acid compound. A wide variety of such oil soluble sulfonic acids operate to increase the dispersancy detergent effect of the Mannich sulfonic acid copolymer product and the reaction rate producing the additive.

The described reaction products of the present invention are effective dispersant and viscosity index improving additives in lubricant compositions when used in amounts from about 0.1 to about 10 percent neat polymer. Further, they tend to be shear stable and less prone to attack engine seals.

Suitable lubricating base oils are mineral oils, petroleum oils, synthetic lubricating oils such as those obtained by the polymerization of hydrocarbons, and other well known synthetic lubricating oils, and lubricating oils of animal or vegetable, origin. Concentrates (major proportion base oil and minor proportion additive of this invention) of a suitable oil base containing more than 10 percent, that is of about 10 wt.% alone or in combination with other well known additives, can be used for blending with the lubricant oils in proportions desired for particular conditions or used to give finished products containing from about 0.1 to about 10% of additives of this invention.

EXAMPLE I

Gaseous ethylene and propylene were each added at a rate of 20 liters per hour to a 2 liter resin kettle containing 1 liter of hexane at about 25° C. Separate streams of 22 g ethyl aluminum dichloride in 130 ml hexane and 0.5 ml of vanadium oxide triethoxide in 150 ml of hexane were added continuously to the reaction solution dropwise. Polymerization started immediately and carbon monoxide was added below the surface of the hexane layer at a rate of 5 ml per minute. The rate of catalyst addition was adjusted so that there was essentially no unreacted olefin off-gas. All of the carbon monoxide addition was completed in 2½ hours while the polymerization temperature was maintained at 25° C. by external cooling.

The polymer was recovered by adding the polymerizate to 8 liters of methanol containing 60 ml of concentrated hydrochloric acid resulting in the precipitation of crude ethylene/propylene/carbon monoxide polymer. The polymer was washed with methanol and dried in a vacuum oven at 50° C. overnight. One hundred and twenty five grams of the polymer (I.V. was 0.68 at 0.4 g/100 ml toluene at 30° C.) was dissolved in 2.5 liters of toluene, filtered, the filtrate was poured into methanol and the polymer recovered by decantation. After drying overnight in a vacuum oven at 50° C. the polymer had an I.V. of 0.76. Infrared analysis indicated that the terpolymer contained carbonyl groups. $^{13}C$ NMR indicated that the terpolymer was composed of 58 mole % ethylene and 42 mole % propylene.

A solution was prepared by adding 83.7 grams of the polymer (in 1 cm$^3$ pieces) to 493.3 grams of 5 weight base oil at 150° C. under a nitrogen atmosphere resulting in a solution having a viscosity of 1875 Saybolt Universal Seconds at 212° F. Thermal evolution analysis revealed 14.5 wt. % nonvolatiles. A 565.1 gram portion of this solution was heated to 360° F. under a nitrogen atmosphere. After 7.04 grams of hexamethylene diamine was added to the polymeric solution, 4.7 grams of polypropylbenzene sulfonic acid (molecular weight 782) followed by 4.8 grams of a 37% aqueous solution of formaldehyde at a rate such that foaming was controlled. The solution was held 1 hour at 360° F. then stripped of volatiles for one hour with nitrogen and allowed to cool under nitrogen. The resulting product was clear and analyzed for nitrogen at 1180 ppm. Infrared analysis showed a prominent 1680 cm$^{-1}$ absorption.

EXAMPLE II

Example I was repeated except a terpolymer having an inherent viscosity of 0.8 in a 12% by weight solution of base oil having a 1996 Saybolt Universal Seconds viscosity at 212° F. was prepared. A 620 gram portion of this solution was treated with 7.70 grams hexametylene diamine, 5.2 grams of the polypropylbenzene sulfonic acid catalyst and 5.31 grams of the formaldehyde solution yielding a clear solution.

EXAMPLE III

Example I was repeated except a terpolymer having an inherent viscosity of 0.54 was prepared by adding carbon monoxide at a rate of 16.5 ml per minute for 2½ hours. A 19% by weight solution of this polymer in a base oil was formed and 154.4 gram portion of the solution was reacted with 1.9 hexamethylene diamine, 1.32 grams of formaldehyde solution and 1.3 grams of polypropylbenzene sulfonic acid catalyst to give a clear product having 957 ppm nitrogen.

EXAMPLE IV

The products of Examples I to III were tested for sludge dispersancy in a Spot Dispersancy Test. All showed high levels of dispersancy relative to commercial products.

TABLE I

| Additive | % in Sludge | % Dispersancy |
|---|---|---|
| Example #1 | 5 | 66 (42) |
|  | 10 | 90 (72) |
|  | 15 | 100 (85) |
| Example #2 | 5 | 59 (61) |
|  | 10 | 69 (74) |
|  | 15 | 77 (79) |
| Example #3 | 5 | 49 (44) |
|  | 10 | 88 (79) |
|  | 15 | 100 (86) |

The values in parentheses are for a commercial dispersant Mannich product.

EXAMPLE V

This Example illustrates the properties of oils blended with the products of Examples I and II. The products of Examples I and II were blended with a blend of 5 weight and 10 weight oil containing 2% dispersant, 1.25% dialkyl dithiophosphate, 0.9% calcium sulfonate, 0.7% calcium phenate and 0.5% flow improver. The table below summarizes the properties of these blends.

| DVM wt % | 212° F. Viscosity (cs) | −18° F. Viscosity (p) |
|---|---|---|
| 13.5 (#1) | 13.39 | 26.0 |
| 13.5 (#2) | 13.12 | 25.0 |
| 14.5 (Commercial Product) | 13.5 | 22.0 |

|  | Pour Point (°F.) | Bosch SSI |
|---|---|---|
|  | −24 | 15.8 |
|  | >−30 | 17.9 |
|  | −27 | 40 |

EXAMPLE VI

This Example illustrates the production of a Mannich Condensation product having carbonyl groups furnished by both carbon monoxide and vinyl methyl ketone.

Gaseous ethylene and propylene were each added at a rate of 18 liters per hour to a 2 liter resin kettle containing 1 liter of hexane at about 25° C. Separate streams of 25 ml of a 50% by weight solution of ethyl aluminum dichloride in hexane and 1.0 ml of vanadium oxide tributoxide in 100 ml of hexane were added continuously to the reaction solution dropwise. Polymerization started immediately and (1) carbon monoxide was added below the surface of the hexane layer at a rate of 2 ml per minute and (2) 2.0 ml methyl vinyl ketone in 500 ml hexane was added dropwise. The rate of catalyst addition was adjusted so that there was essentially no unreacted olefin off-gas. All of the vinyl methyl ketone and carbon monoxide additions were completed in 2½ hours while the polymerization temperature was maintained at 25° C. by external cooling. The polymerizate was poured into 6.8 liters methanol containing 60 ml H Cl precipitating about 125 grams crude polymer. The crude polymer was dissolved in 2.5 liters toluene, filtered and reprecipitated yielding 95 grams polymer having an I.V. of 1.01.

A solution was prepared by adding 63.5 grams of the polymer (in 1 cm$^3$ pieces) to 578 grams of 5 weight base oil at 150° under a nitrogen atmosphere resulting in a solution having viscosity of 2493 Saybolt Universal Seconds at 212° F. Thermal evolution analysis revealed 10.35 wt.% nonvolatiles. A 150.6 gram portion of this solution was heated to 360° F. under nitrogen atmosphere. After 1.25 grams of hexamethylene diamine was added to the polymeric solution, 0.84 grams of polypropylbenzene ammonium sulphonate catalyst (molecular weight 780) followed by 0.43 grams of a 37% aqueous solution of formaldehyde at a rate such that foaming was controlled. The solution was held 1 hour at 360° F. then stripped of volatiles for 1 hour with nitrogen and allowed to cool under nitrogen. The resulting product was clear and analyzed for nitrogen at 360 ppm. Infrared analysis showed a prominent 1680 cm$^{-1}$ absorption.

The table below demonstrates the dispersancy results from the Spot Dispersancy Test.

| ADDITIVE | % IN SLUDGE | % DISPERSANCY |
|---|---|---|
| Product of this Example | 5 | 39 |
|  | 10 | 71 |
|  | 15 | 83 |
| Commercial Product | 5 | 49 |
|  | 10 | 79 |
|  | 15 | 82 |

The above data clearly shows that Mannich Condensation products based upon ethylene/propylene/carbonyl are advantageous dispersants VII products.

EXAMPLE VII

This Example illustrates the production of a dispersant ethylene/propylene/methyl vinyl ketone polymer. Gaseous ethylene and propylene were each added at a rate of 20 liters per hour to a 2 liter resin kettle containing 1 liter of hexane at about 25° C. Separate streams of 17.5 grams of ethyl aluminum dichloride in 130 ml hexane and 0.5 ml of vanadium oxide triethoxide in 150 ml hexane were added continuously to the reaction solution dropwise. Polymerization started immediately and a solution of 5 ml vinyl methyl ketone in 500 ml hexane was added dropwise in a continuous manner. The rate of catalyst addition was adjusted so that there was essentially no unreacted olefin off-gas. All of the vinyl methyl ketone addition was completed in 2½ hours while the polymerization temperature was maintained at 25° C. by external cooling.

The polymer was purified by adding the polymerizate to 8 liters of methanol containing 60 ml of concentrated hydrochloric acid resulting in the precipitation of crude ethylene/propylene/methyl vinyl ketone polymer. The product was washed with methanol and dried overnight in a vacuum oven at 50° C. One hundred thirty grams of polymer was recovered having an inherent viscosity of 0.89 (0.4 grams/100 ml in toluene at 30° C.). The product was redissolved in 2.5 liters toluene, filtered and precipitated in methanol yielding a polymer having an I.V. of 0.95. Infrared analysis indicated that the polymer had 0.62% by weight of methyl vinyl ketone moieties and $^{13}$C NMR indicated a 56/44 mole ratio of ethylene and propylene.

After 9.06 grams of hexamethylene diamine was added to 729 grams of the product produced in the preceding paragraphs, the reactants were heated to 360° F. under nitrogen. After 6.11 grams of polypropyl sulfonic acid (molecular weight 782) was added rapidly, 6.25 grams of 37% aqueous formaldehyde was added dropwise at a rate that frothing was controlled. The resulting mixture was held for one hour at 360° F. under nitrogen and stripped one hour by raising the nitrogen flow to approximately 2 SCFH. The resulting product contained 1100 ppm N and was clear and light in color.

| ADDITIVE | % IN SLUDGE | % DISPERSANCY |
|---|---|---|
| This Example | 5 | 69 |
|  | 10 | 90 |
|  | 15 | 100 |
| Commercial Product | 5 | 44 |
|  | 10 | 78 |
|  | 15 | 91 |

EXAMPLE VIII

This Example illustrates an engine test of a terpolymer having an inherent viscosity of 0.79 prepared by the method of Example VII. A 2,864 gram portion of an 11% by weight solution of terpolymer having a viscosity of 1700 Saybolt Universal Seconds was aminated with 35.6 grams of hexamethylene diamine, 24.5 grams of 37% by weight aqueous formaldehyde and 24.0 grams of polypropylbenzene sulfonic acid as described in Example VII. When the product was dissolved at 14.5% in an oil containing 2% dispersant, 1.25% zinc dialkyl dithiophosphate, 0.9% calcium sulfonate, 0.7% calcium phenate and 0.5% flow improver, a clear oil of 13.5 cs (100° C.) viscosity was obtained. The oil had a viscosity at −18° C. of 24.7 p, a pour point greater than −21° C. The shear stability index of the above formulation (obtained by standard procedure in a Bosch shear injector) was 33.4; A comparable value for the commercial product was 53.2.

The above formulation was tested in a VD engine stand:

|  | AVERAGE SLUDGE | AVERAGE VARNISH | PISTON VARNISH |
|---|---|---|---|
| This Example | 9.66 | 8.05 | 7.38 |
| Commercial Product | 9.45 | 6.74 | 6.98 |

(10 = clean)

EXAMPLE IX

Gaseous ethylene and propylene were each added at a rate of 54 liters/hour to a 5 liter resin kettle containing 3 liters of hexane at 8° C. Separate streams of ethyl aluminum dichloride in hexane (25 grams in 200 ml) and 6.1 ml of vanadium oxide tributoxide in 150 ml of hexane were added continuously to the reaction. Polymerization started immediately and carbon monoxide was added below the surface of the hexane solution at a rate of 3.5 ml per minute. All of the carbon monoxide addition was completed in 2½ hours while polymerization temperature was maintained at 23°–29° by external cooling. The polymer was recovered by adding the polymerizate to 14.5 liters methanol containing 110 ml conc. HCl resulting in the precipitation of 311 grams of ethylene/propylene/carbon monoxide polymer.

Two additional polymerizations were carried out in a similar way. A 784 gram portion of the 3 combined runs was dissolved in 17 liters toluene, filtered, and poured into 69.3 liters methanol and the polymer recovered by decantation. After drying in a vacuum oven at 50° C., 664 grams of polymer was recovered having an inherent viscosity of 0.67 (0.4 grams/100 ml in toluene at 30°).

A 13.7% by weight solution of the polymer in 5 weight oil was prepared. Two thousand one hundred and ninety-eight grams of this solution was reacted with 27.3 grams hexamethylene diamine, 18.8 grams of 37.5% by weight formalin solution and 18.4 grams of polypropylbenzene sulphonic acid (ammonium salt having molecular weight of about 700) in the manner described in Example I. The product was also recovered in essentially the same manner.

EXAMPLE X

Example VII was repeated six times except that 2.0 ml of methyl vinyl ketone in hexane was employed at a polymerization temperature of 36° to 39° C. Approximately 125 grams of ethylene/propylene/methyl vinyl ketone terpolymer was produced in each run. The polymerizates from the six runs were dissolved in 15 liters toluene, filtered, precipitated in 72.5 liters methanol, decanted and dried in a vacuum oven yielding 631 grams of ethylene/propylene/methyl vinyl ketone polymer having an I.V. of 0.72.

A 13.5% by weight solution of the polymer in 5 weight oil was prepared. Two thousand two hundred and fifty-three grams of this solution was reacted with 28 grams of hexamethylene diamine, 19.3 grams of 37.5% by weight formalin solution and 18.9 grams of polypropylbenzene sulphonic acid (ammonium salt having molecular weight of about 700) in the manner described in Example I. The product was also recovered in essentially the same manner.

EXAMPLE XI

The Mannich Condensation products of Examples IX and X were used in a Peugeot 204 engine test.

|  | $V_o$ | $V_f$ | Peugeot SSI | % Rubber in Oil |
|---|---|---|---|---|
| Product of Example X | 16.09 cs | 12.89 cs | 31.1 | 2.3 |
| Product of Example IX | 14.43 cs | 12.35 cs | 24.1 | 2.1 |

Under conditions of the Peugeot 204 test, the oils must be blended to 10W40 having an initial viscosity ($V_o$) of $\leq 16.3$ cs (100° C.). In order to pass the test, the viscosity after shear ($V_f$) must be $\geq 11.8$ cs. Accordingly, the Mannich Condensation Products of Examples IX and X passed the above test.

We claim:

1. A Mannich condensation product of an amorphous, oil soluble olefin/carbonyl polymer, amine and formaldehyde yielding reactant wherein the carbonyl groups are provided by at least one member selected from the group consisting of carbon monoxide in a concentration up to 1.0 parts by weight per 100 parts by weight olefin and vinyl alkyl ketone in a concentration up to 7.5 parts by weight per 100 parts by weight olefin.

2. The product of claim 1 wherein said olefin comprises propylene.

3. The product of claim 1 wherein said olefin comprises ethylene.

4. The product of claim 1 wherein said olefin comprises ethylene and propylene.

5. The product of claim 4 wherein the mole ratio of ethylene to propylene is from about 35:65 to 60:40.

6. The product of claim 5 wherein the carbonyl groups are provided by both carbon monoxide and a vinyl methyl ketone.

7. The Mannich condensation product of an amorphous, oil soluble olefin/carbon monoxide polymer, amine and formaldehyde yielding reactant wherein the carbonyl content of the polymer ranges from about 0.01 to 1.0 parts by weight per 100 parts by weight of olefin monomer.

8. The product of claim 7 wherein the carbonyl content of the polymer ranges from about 0.01 to 0.2 parts by weight of 100 parts by weight of olefin monomer.

9. The product of claim 8 wherein the olefin comprises ethylene.

10. The product of claim 8 wherein the olefin comprises propylene.

11. The product of claim 8 wherein the olefin comprises ethylene and propylene.

12. The product of claim 11 wherein the mol ratio of ethylene to propylene is about 35:65 to 60:40.

13. The Mannich condensation product of an amorphous, oil soluble olefin/vinyl alkyl ketone polymer, amine and formaldehyde yielding reactant wherein the vinyl alkyl ketone content of the polymer ranges from 0.05 to 7.5 parts by weight vinyl alkyl ketone per 100 parts by weight of olefin monomer.

14. The product of claim 13 wherein the olefin comprises ethylene.

15. The product of claim 13 wherein the olefin comprises propylene.

16. The product of claim 13 wherein the olefin comprises ethylene and propylene.

17. The product of claim 16 wherein the mol ratio of ethylene to propylene is about 35:65 to 60:40.

* * * * *